UNITED STATES PATENT OFFICE.

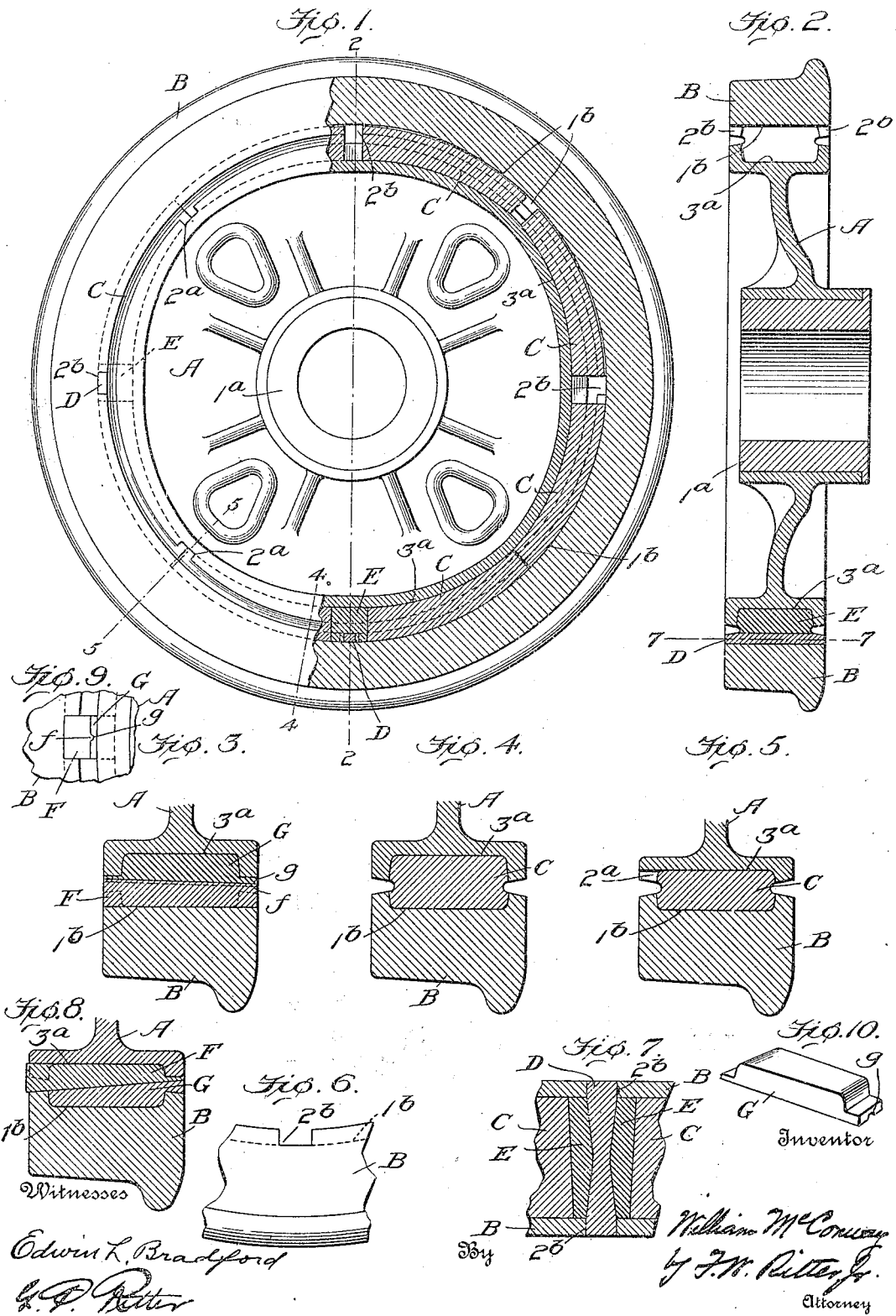

WILLIAM McCONWAY, OF PITTSBURG, PENNSYLVANIA.

CAR-WHEEL.

962,456.  Specification of Letters Patent.  Patented June 28, 1910.

Application filed March 25, 1910. Serial No. 551,550.

*To all whom it may concern:*

Be it known that I, WILLIAM McCONWAY, a citizen of the United States, residing at Pittsburg, in the county of Allegheny and State of Pennsylvania, have invented certain new and useful Improvements in Car-Wheels; and I do hereby declare the following to be a full, clear, and exact description of the invention, such as will enable others skilled in the art to which it appertains to make and use the same.

My invention relates to the construction of a wheel which is especially adapted for application to railway vehicles, the principal object of the invention being to afford a simple, strong, secure and easily manufactured composite structure which shall efficiently prevent any turning movement of the tire on the wheel center and shall effectually resist the shocks and pounding incident to service without developing any looseness of parts causing the wheel to rattle.

To this end, the principal feature of my invention, generally stated, consists in interlockingly connecting a wheel center and tire by means of an interposed filling of cast metal having socketed engagement with said wheel center and tire, and in combining therewith a key or a series of keys which engage and interlock with the tire and are interlockingly embedded in metal cast in place between the tire and wheel center.

There are other, minor, features of invention, residing in particular combinations and features of elemental construction, all as will hereinafter more fully appear.

In the drawings chosen for the purpose of illustrating my invention, the scope whereof is pointed out in the claims: Figure 1 is a view partly in side elevation and partly in vertical central section of a car wheel embodying my invention, a portion of the view representing the condition of the structure after the circumferentially extending wedges have been cast in place and before the keys which interlock with the tire have been inserted and embedded in cast metal; Fig. 2 is a vertical, transverse section of the wheel, taken in the plane of the line 2—2, Fig. 1; Fig. 3 is a sectional detail view of a portion of the wheel center and tire, showing the interposed removable wedge fillers used to maintain the relative position of the wheel-center and tire during the casting of the circumferential locking wedges; Fig. 4 is a detail, transverse section, taken in the plane of the line 4—4, Fig. 1; Fig. 5 is a detail, transverse section, taken in the plane of the line 5—5, Fig. 1; Fig. 6 is a detail elevation of a portion of the tire, showing one of the notches or seats for a transversely extending key; Fig. 7 is a detail section, taken in the plane of the line 7—7, Fig. 2; Fig. 8 is a detail sectional view of one of the sets of fillers employed to maintain the proper relation of the wheel center and tire prior to casting the circumferentially extending wedges in place; Fig. 9 is a detail, plan view of a portion of the wheel center and tire showing the fillers at the widest part of the annular space between the wheel center and tire; and Fig. 10 is a detail perspective view of one of the fillers.

Like symbols refer to like parts wherever they occur.

I will now proceed to describe my invention more fully, so that others skilled in the art to which it appertains may apply the same.

In the practice of my invention it is preferred to form the wheel center of cast steel and to employ a rolled steel tire, the circumferentially extending wedges cast in place between the wheel center and tire being preferably of a metal offering great resistance to compression, such, for example, as cast iron, as when so constructed the intimate contact of the circumferential wedges with the wheel center and tire is less likely to be impaired by the shocks and blows received by the wheel when in service, and a wheel of high durability results.

In the drawings, A indicates the wheel center and 1$^a$ the hub thereof. This hub member is preferably formed as a cast iron bushing around which the wheel center is securely shrunk, cast iron being a material which affords advantages over cast or forged steel in the matter of fitting the wheel to the axle, in that its working is better understood and less pressure is required to force the cast iron hub upon the axle than is required where the hub is formed of a steel forging or casting.

The periphery of the wheel center A is formed as a series of circumferentially extending, eccentric, segmental faces 3$^a$ which, in cross-section, are other than ruled surfaces, and preferably form a continuous channeled or socketed peripheral face. As shown in the drawings, these eccentric, segmental faces 3$^a$ of the wheel center are preferably so arranged that the space between the periphery of the wheel center A and the interior circumference of the tire B consists of a series of wedge-like spaces each of which has its taper opposed to the direction of taper of the circumferentially extending wedge-shaped spaces immediately adjacent thereto.

The tire member B, which, as just pointed out, has a central opening of sufficient diameter to receive the wheel center A and form an annular space between these two parts, has its inner circumferential face $1^b$ channeled or socketed in order to interlock with the wedges C which are cast in place in the annular space, as will be hereafter described, it being desirable that the elements of the channeled surface $1^b$ should be circular so that the tire may be readily formed by rolling. The upper and lower retaining flanges of the tire member, which are formed by the channel $1^b$, are formed at intervals with pairs of oppositely disposed rectangular notches $2^b$, each pair of notches or key-seats being adapted to receive a transversely extending locking key D and there being a pair of key seats to each pair of circumferentially extending wedges C. These locking keys D, which may be of forged steel, are of a different, preferably smaller, cross-sectional area at their centers than at their ends, as shown particularly in Fig. 7, so that, when embedded in the metal filling E that is cast in the space left by driving two of the locking wedges C apart, said keys are securely locked in place.

To permit the circumferentially extending wedges C to be cast in place between the tire B and wheel center A, the tire and wheel center may be secured in proper relation by means of several sets of equally spaced fillers or wedges, in like manner as set forth in Letters Patent #929,321, granted to me on July 27, 1909.

In the present instance, however, I prefer to employ but two wedge fillers F and G to each set, said fillers having their adjacent, or contacting faces reversely inclined to obtain a wedging action between them, their outer or opposite faces curved or otherwise shaped to conform to the channels in the outer peripheral face of the wheel center A and the inner circumferential face of the tire B at the points where the fillers are inserted, and their edges converging, so that each member has in effect a double taper which facilitates the withdrawal of the wedges from between the cast circumferential wedges C, after the cast metal has cooled.

The dimensions of the respective sets of fillers F and G will be proportioned to the positions they are to occupy in the annular space between the wheel-center and tire. Those which are to be inserted at the narrowest points, or at the apices of the circumferential wedges C, will be the smaller, as indicated in Fig. 8 of the drawing, while those that are to occupy the wider portion of the annular space, or between the bases of the circumferential wedges C, will be larger as indicated in Figs. 3 and 9 of the drawings, and these latter fillers are preferably formed on their adjacent faces the one with a longitudinal groove $g$ and the other with a corresponding rib $f$, as indicated in Figs. 9 and 10 of the drawings. In cross section these fillers F and G are of such shape as to fit one or the other of the notches $2^a$ in the periphery of the wheel center A, or the key notch $2^b$ in the inner circumference of the tire B. While the key notches $2^b$ in the tire intended for the permanent key D will serve for introducing and withdrawing the fillers F and G at the widest portions of the annular space, special notches $2^a$ in the wheel center A are required for the introduction of the smaller fillers at the narrowest points of the annular space between the wheel center and tire.

To secure the tire B to the wheel center A so that the curved locking wedges C may be cast in place, the wheel center is properly positioned within the tire and the filler member G of each set is first inserted in its proper position after which the filler members F of the respective sets are inserted through the notches $2^a$ and $2^b$, as the case may be, and driven home. This forces the fillers F and G into intimate interlocking contact with the tire and wheel center, thus securing those parts in the relation they are to ultimately occupy in the finished wheel. Through the arc-shaped apertures then existing between the wheel-center and tire, molten metal is poured into each of the tapering segmental spaces bounded by the tire, wheel center and adjacent sets of fillers and wedges. When cooled this molten metal forms a series of curved locking wedges C interposed between the wheel center A and tire B and conforming to the configuration of the adjacent faces of said wheel center and tire.

After the circumferentially extending wedges C have cooled the several sets of fillers are removed, such removal being readily effected by reason of the double tapering form of these members. The curved wedges C are then forced or driven in a circumferential direction until each is in intimate contact with the wheel center A and tire B, looseness due to the shrinkage of the cast wedges C being thus entirely taken up. The wedges C, having inclined ends as a result of being cast against the inclined faces or sides of the fillers may be conveniently forced into intimate contact with the wheel center and tire by driving suitably proportioned wedges into the spaces left between the thicker ends of each oppositely tapered pair by the withdrawal of the sets of fillers, the spaces left between the adjacent thinner ends of the circumferentially extending wedges C affording sufficient clearance to permit such wedges to be driven into intimate contact with the periphery of the wheel center and the inner circumferential surface of the tire. In Fig. 1 of the drawings some of these circumferential wedges C are shown in the positions they occupy after being cast and before being driven to their ultimate positions, and other of the wedges are illustrated in their final positions.

When the curved locking wedges C have been forced into intimate contact with the wheel center A and tire B, the wedges by which the circumferential movement of the members C is effected are removed and the forged steel keys D are fitted into the notches or key-seats $2^b$ of the tire, after which the spaces left between the wheel center, tire and thicker ends of the curved wedges C are filled with molten metal, preferably cast iron, which forms fillers E that securely lock the keys D in place and transmit to the circumferentially extending wedges C any strains which may be imparted to the keys by a tendency of the tire B to turn with respect to the wheel center A.

Having thus described my invention, what I claim and desire to secure by Letters Patent is:

1. A car wheel comprising a wheel center, a tire formed with key-seats therein, locking members interposed between and having socketed engagement with the wheel center and tire, a key engaging the key-seats of the tire and embedded in a metal filler cast between the wheel center, tire and adjacent locking members, and a filler cast in place between the said wheel center, tire and adjacent locking members.

2. A car wheel comprising a wheel center, a tire formed with key-seats therein, locking members cast in place between the wheel center and tire and having socketed engagement with each, a key engaging the key-seats of the tire, said key having cross-sections of different areas, and a filler cast in place and locking said key in said key-seats.

3. A car wheel comprising a wheel center, a tire formed with key-seats, a filling of metal cast in place between the wheel center and tire and having socketed engagement with each, and a key extending into the key-seats of the tire and embedded in metal cast in place between the wheel center and tire.

4. A car wheel comprising a wheel center having a channeled periphery, a tire having a channeled inner circumference and formed with key-seats, a plurality of circumferentially extending wedges interposed between the wheel center and tire and having socketed engagement with each, a key engaging the key-seats of the tire, and a filler cast in place between adjacent wedges and locking said key in place in the key-seats of the tire.

In testimony whereof I affix my signature, in presence of two subscribing witnesses.

WILLIAM McCONWAY.

Witnesses:
J. W. HARTLEY,
F. D. ECKER.